(12) United States Patent
Yamazaki et al.

(10) Patent No.: US 8,170,754 B2
(45) Date of Patent: May 1, 2012

(54) VEHICLE BODY DRIFTING RESTRAINING DEVICE

(75) Inventors: Norio Yamazaki, Utsunomiya (JP); Yoshimichi Kawamoto, Shioya-gun (JP); Shigenori Takimoto, Utsunomiya (JP); Yoshifumi Nakamura, Utsunomiya (JP); Isao Akimoto, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 12/428,056

(22) Filed: Apr. 22, 2009

(65) Prior Publication Data

US 2009/0271072 A1 Oct. 29, 2009

(30) Foreign Application Priority Data

Apr. 24, 2008 (JP) .................. 2008-113910

(51) Int. Cl.
*B60R 22/00* (2006.01)
(52) U.S. Cl. ................. 701/45; 701/70; 701/71; 701/72
(58) Field of Classification Search .......... 701/36, 701/38, 45, 70, 71, 72
See application file for complete search history.

(56) References Cited

U.S. PATENT DOCUMENTS

| 5,890,084 | A | * | 3/1999 | Halasz et al. | .............. | 701/45 |
| 6,304,805 | B1 | * | 10/2001 | Onogi | .............. | 701/36 |
| 7,797,093 | B2 | * | 9/2010 | Tsukasaki et al. | .............. | 701/70 |
| 7,822,521 | B2 | * | 10/2010 | Kuttenberger et al. | ......... | 701/45 |

FOREIGN PATENT DOCUMENTS

| DE | 38 37 864 A1 | 5/1990 |
| DE | 10 2005 041 959 A1 | 3/2007 |
| GB | 2 382 158 A | 5/2003 |
| JP | 62-216866 A | 9/1987 |
| JP | 1-168326 U | 11/1989 |
| JP | 5-180939 A | 7/1993 |
| JP | 09-161196 A | 6/1997 |
| JP | 11-073596 A | 3/1999 |
| JP | 11-245837 A | 9/1999 |
| JP | 2001-088676 A | 4/2001 |
| JP | 2001-260704 A | 9/2001 |
| JP | 2003-019913 A | 1/2003 |
| JP | 2004-005616 A | 1/2004 |
| JP | 2006-312421 A | 11/2006 |
| JP | 2007-022169 A | 2/2007 |
| JP | 2007-062712 A | 3/2007 |
| JP | 2007-168617 A | 7/2007 |
| WO | WO 2009/131116 A1 | 10/2009 |

* cited by examiner

*Primary Examiner* — Toan To
(74) *Attorney, Agent, or Firm* — Arent Fox LLP (57) ABSTRACT

A vehicle body drifting restraining device which restrains a drifting of a vehicle body, wherein: when a brake control device operation prohibition switch, which prohibits an operation of a brake control device, is in a state of prohibition, a control for restraining the drifting of the vehicle body is prohibited.

8 Claims, 7 Drawing Sheets

VEHICLE BODY DRIFTING RESTRAINING DEVICE

BACKGROUND OF THE INVENTION

1. Field of the Invention

The present invention relates to a vehicle body drifting restraining device which restrains a drifting of a vehicle body with respect to a lateral slope of a road surface. Priority is claimed on Japanese Patent Application No. 2008-113910, filed Apr. 24, 2008, the content of which is incorporated herein by reference.

2. Description of Related Art

To enable safe driving during rain, some roads have lateral slopes on their surface so that rain will not accumulate on the road surface. When a vehicle is running on such a road that has a lateral slope, the vehicle drifts towards a lower portion of the road surface. Hereinafter, this phenomenon will be called "vehicle body drifting."

When vehicle body drifting occurs in this way, a driver's burden of driving the vehicle increases because the driver is forced to adjust the operation of the vehicle by using a steering wheel in order to drive straight without having the vehicle drift towards the lower portion of the road surface.

Consequently, vehicle body drifting restraining devices have been developed, which restrain the drifting of the vehicle body while reducing the driver's burden of driving the vehicle. For example, an electric-powered steering device is known, which increases the control of a steering assist amount when vehicle body drifting is detected, compared to when vehicle body drifting has not occurred (for example, refer to Japanese Unexamined Patent Application, First Publication No. 2007-168617).

SUMMARY OF THE INVENTION

However, there is a problem in that, when a vehicle body drifting restraining device restrains the drifting of a vehicle body while a driver wishes to drive and operate the vehicle in a highly proactive manner, the driver's operation of the vehicle and the restraining of vehicle body drifting interfere with one another, thereby worsening the steering feel.

Consequently, an object of the present invention is to provide a vehicle drifting restraining device that is capable of refraining from performing the control of restraining vehicle body drifting when it is presumed that the driver does not want vehicle body drifting to be restrained.

In order to solve the above problem, a vehicle body drifting restraining device according to the present invention employs the following configuration:

(1) An aspect of the present invention is a vehicle body drifting restraining device which restrains a drifting of a vehicle body, wherein: when a brake control device operation prohibition switch, which prohibits an operation of a brake control device, is in a state of prohibition, a control for restraining the drifting of the vehicle body is prohibited.

By implementing the structure of the present invention in these ways, when the brake control device operation prohibition switch is in a state of prohibition, it is possible to presume that the driver wishes to operate the vehicle in a proactive manner, and concerning the control of restraining vehicle body drifting (hereinafter referred to as vehicle body drifting restraining control), it is possible to determine that the driver does not want the vehicle body drifting restraining control to be performed. Therefore, it is possible to prohibit the performance of the vehicle body drifting restraining control. On the other hand, when the brake control device operation prohibition switch is not in a state of prohibition, it is possible to determine that the driver wishes the vehicle body drifting restraining control to be performed, and in such case, it is possible to perform the vehicle body drifting restraining control.

(2) An aspect of the present invention is a vehicle body drifting restraining device which restrains a drifting of a vehicle body, wherein: when a cruise control device is operating, a control that restrains the drifting of the vehicle body is performed.

By implementing the structure of the present invention in these ways, when the cruise control device is in operation, it is possible to presume that the driver does not wish to operate the vehicle in a proactive manner, it is possible to determine that the driver wants the vehicle body drifting restraining control to be performed, and in such a case, it is possible to perform the vehicle body drifting restraining control. On the other hand, when the cruise control device is not in operation, it is possible to determine that the driver wishes to participate in the driving of the vehicle, and concerning the vehicle body drifting restraining control, it is possible to determine that the driver does not want the vehicle body drifting restraining control to be performed. Therefore, it is possible to refrain from performing the vehicle body drifting restraining control.

(3) The present invention may be configured as a vehicle body drifting restraining device, wherein: the control for restraining the drifting of the vehicle body restrains the drifting of the vehicle body with respect to a lateral slope of a road surface.

(4) The present invention may be configured as a vehicle body drifting restraining device, wherein: the vehicle body is prevented from drifting towards a lower portion of the road surface.

(5) The present invention may be configured as a vehicle body drifting restraining device, wherein: the control that restrains the drifting of the vehicle body of a vehicle is performed based on a steering torque of the vehicle that is running straight.

(6) The present invention may be configured as a vehicle body drifting restraining device, wherein: whether or not the vehicle is running straight is determined based on a vehicle behavior determination unit and a driver performance determination unit.

(7) The present invention may be configured as a vehicle body drifting restraining device, wherein: a determination of a vehicle behavior determination unit is based on at least one of a lateral acceleration sensor, a longitudinal acceleration sensor, and a yaw rate sensor.

(8) The present invention may be configured as a vehicle body drifting restraining device, wherein: a determination of a driver performance determination unit is based on at least one of a steering angle sensor and an accelerator opening sensor.

EFFECTS OF THE INVENTION

According to an invention according to (1) above, since it is possible to prohibit the performance of the vehicle body drifting restraining control when the brake control device operation prohibition switch is in a state of prohibition, and to perform the vehicle body drifting restraining control when the brake control device operation prohibition switch is not in a state of prohibition, it is therefore possible to change the driver's level of participation in the driving of the vehicle according to the state of the brake control device operation prohibition switch. Therefore, it is possible to prevent the interference between the driver's operation of the vehicle and the restraining of vehicle body drifting, thus improving the steering feel.

According to an invention according to (2) above, since it is possible to perform the vehicle body drifting restraining control when the cruise control device is in operation, and to refrain from performing the vehicle body drifting restraining control when the cruise control device is not in operation, it is therefore possible to change the driver's level of participation in the driving of the vehicle according to whether or not the cruise control device is in operation. Therefore, it is possible to prevent the interference between the driver's operation of the vehicle and the restraining of vehicle body drifting, thus improving the steering feel.

DETAILED DESCRIPTION OF THE INVENTION

Hereunder, an embodiment of the vehicle body drifting restraining device according to the present invention is described with reference to the drawings of FIG. 1 to FIG. 8.

First Embodiment

Hereunder, a first embodiment of the vehicle body drifting restraining device according to the present invention is described with reference to the drawings from FIG. 1 to FIG. 6.

Figure 1:
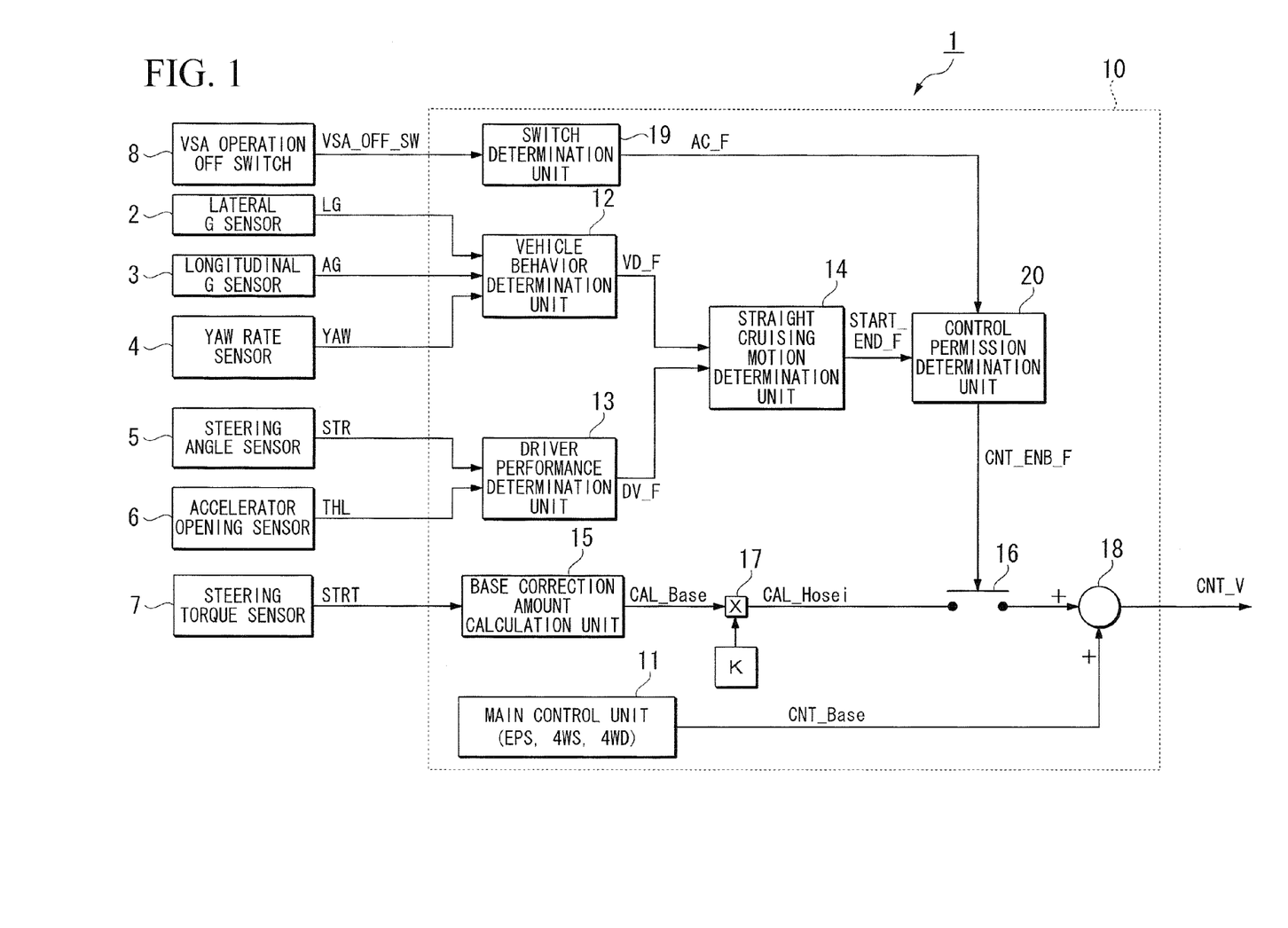
FIG. 1 is a block diagram in a first embodiment of a vehicle body drifting restraining device according to the present invention.

As shown in the block diagram in FIG. 1, the vehicle body drifting restraining device 1 in the first embodiment includes a lateral acceleration sensor (hereinafter referred to as lateral G sensor) 2 that detects a vehicle's acceleration in the left-right direction (hereinafter referred to as lateral acceleration), a longitudinal acceleration sensor (hereinafter referred to as longitudinal G sensor) 3 that detects a vehicle's acceleration in the front-back direction (hereinafter referred to as longitudinal acceleration), a yaw rate sensor 4 that detects a vehicle's yaw rate, a steering angle sensor 5 that detects a steering angle of a vehicle's steering shaft, an accelerator opening sensor 6 that detects an accelerator opening of a vehicle's accelerator, a steering torque sensor 7 that detects a steering torque that is applied to a steering shaft, a VSA operation OFF switch 8 that is turned on by a driver when an operation of a VSA is prohibited, and an electronic control device (ECU) 10.

In addition, a VSA (Vehicle Stability Assist System) is a system that controls the stability of the behavior of a vehicle, combining the restraining of a vehicle's lateral drifting when the vehicle is turning, with an ABS (Anti-lock Braking System) that prevents the locking of a wheel when a brake is applied, and a TCS (Traction Control System) that prevents the spinning of a wheel when the vehicle is accelerating and so forth, thus controlling these three features in a comprehensive manner. For example, when a vehicle is about to oversteer, the oversteering is restrained by applying a brake to the front outer-ring; and when a vehicle is about to understeer when the vehicle is turning and accelerating, the understeering is restrained by reducing the engine output and by applying a brake to the front inner-ring as necessary. Therefore, when the VSA operation OFF switch 8 is turned on (VSA operation prohibition state), the operation of a brake control device is prohibited; and when the VSA operation OFF switch 8 is turned off (VSA operation permission state), the operation of a brake control device is permitted because the operation of the VSA is permitted. In the first embodiment, the VSA operation OFF switch 8 includes a brake control device operation prohibition switch that prohibits the operation of a brake control device.

The lateral G sensor 2, the longitudinal G sensor 3, the yaw rate sensor 4, the steering angle sensor 5, the accelerator opening sensor 6, and the steering torque sensor 7 output respectively an output signal LG, AG, YAW, STR, THL, and STRT to the ECU 10 according to detected values. In addition, the VSA operation OFF switch 8 outputs an output signal VSA_OFF_SW to the ECU 10 according to whether the VSA operation OFF switch 8 is turned on or off.

The ECU 10 includes a main control unit 11, a vehicle behavior determination unit 12, a driver performance determination unit 13, a straight cruising motion determination unit 14, a base correction amount calculation unit 15, a switch determination unit 19, a control permission determination unit 20, and a vehicle body drifting restraining control ON/OFF switch 16, etc.

The main control unit 11 is a control unit that is executed regardless of whether or not the vehicle body drifting restraining control is performed, which controls elements that can change a vehicle's yaw angle. When the vehicle body drifting restraining control is performed, the drifting of the vehicle body is restrained by correcting a base control amount (CNT_Base) which is outputted from this main control unit 11.

For example, the main control unit 11 can be configured as a steering assist control at an electrical power steering device (hereinafter referred to as EPS), and a base control amount (CNT_Base) in this case becomes a target steering assist torque. Alternatively, the main control unit 11 can be configured as a rear rudder angle control at a four-wheeled steering device (hereinafter referred to as 4WS), and a base control amount (CNT_Base) in this case becomes a target rear rudder angle. Alternatively, the main control unit 11 can be configured as a driving torque control at a four-wheeled driving device (hereinafter referred to as 4WD), and a base control amount (CNT_Base) in this case becomes a target right/left driving torque.

The vehicle behavior determination unit 12 determines a vehicle's behavior based on output signals by the lateral G sensor 2, the longitudinal G sensor 3, and the yaw rate sensor 4. Describing this feature in more detail, the vehicle behavior determination unit 12 determines how straight a vehicle is running based on output signals by the lateral G sensor 2 and the yaw rate sensor 4, and determines whether or not a vehicle is in cruising motion based on an output signal by the longitudinal G sensor 3.

Describing this feature in more detail, when the absolute value of a lateral acceleration LG detected by the lateral G sensor 2 is less than a predetermined value A (m/s$^2$), and, when the absolute value of a yaw rate YAW detected by the yaw rate sensor 4 is less than a predetermined value B (rad/s), the vehicle behavior determination unit 12 determines that the vehicle is running straight. When the absolute value of a lateral acceleration LG is greater than or equal to the predetermined value A (m/s$^2$), or when the absolute value of a yaw rate is greater than or equal to the predetermined value B (rad/s), the vehicle behavior determination unit 12 determines that the vehicle is not running straight.

In addition, when the absolute value of a longitudinal acceleration AG detected by the longitudinal G sensor 3 is less than a predetermined value C (m/s$^2$), the vehicle behavior determination unit 12 determines that the vehicle is in cruising motion, and when the absolute value of a longitudinal acceleration AG is greater than or equal to the predetermined value C (m/s$^2$), the vehicle behavior determination unit 12 determines that the vehicle is not in cruising motion.

It can be said that, while a vehicle is in cruising motion, the degree of a driver's activity with respect to the vehicle's longitudinal movement is low, and while a vehicle is not in cruising motion, the degree of a driver's activity with respect to the vehicle's longitudinal movement is high. In other words, the vehicle behavior determination unit 12 determines the level of a driver's activity with respect to a vehicle's longitudinal movement based on a longitudinal acceleration detected by the longitudinal G sensor 3.

Furthermore, when the absolute value of a lateral acceleration LG is less than a predetermined value A (m/s$^2$), and, when the absolute value of a yaw rate YAW is less than a predetermined value B (rad/s), and, when the absolute value of a longitudinal acceleration AG is less than a predetermined value C (m/s$^2$), the vehicle behavior determination unit 12 determines that the vehicle is in straight cruising motion (running steadily), and sets a straight cruising motion flag VD_F equal to "1." When the absolute value of a lateral acceleration LG is greater than or equal to the predetermined value A (m/s$^2$), or, when the absolute value of a yaw rate YAW detected by the yaw rate sensor 4 is greater than or equal to the predetermined value B (rad/s), or, when the absolute value of a longitudinal acceleration AG detected by the longitudinal G sensor 3 is greater than or equal to the predetermined value C (m/s$^2$), the vehicle behavior determination unit 12 determines that the vehicle is not in straight cruising motion, and sets the straight cruising motion flag VD_F equal to "0." Further, the vehicle behavior determination unit 12 outputs the straight cruising motion flag VD_F signal to the straight cruising motion determination unit 14.

Figure 4:
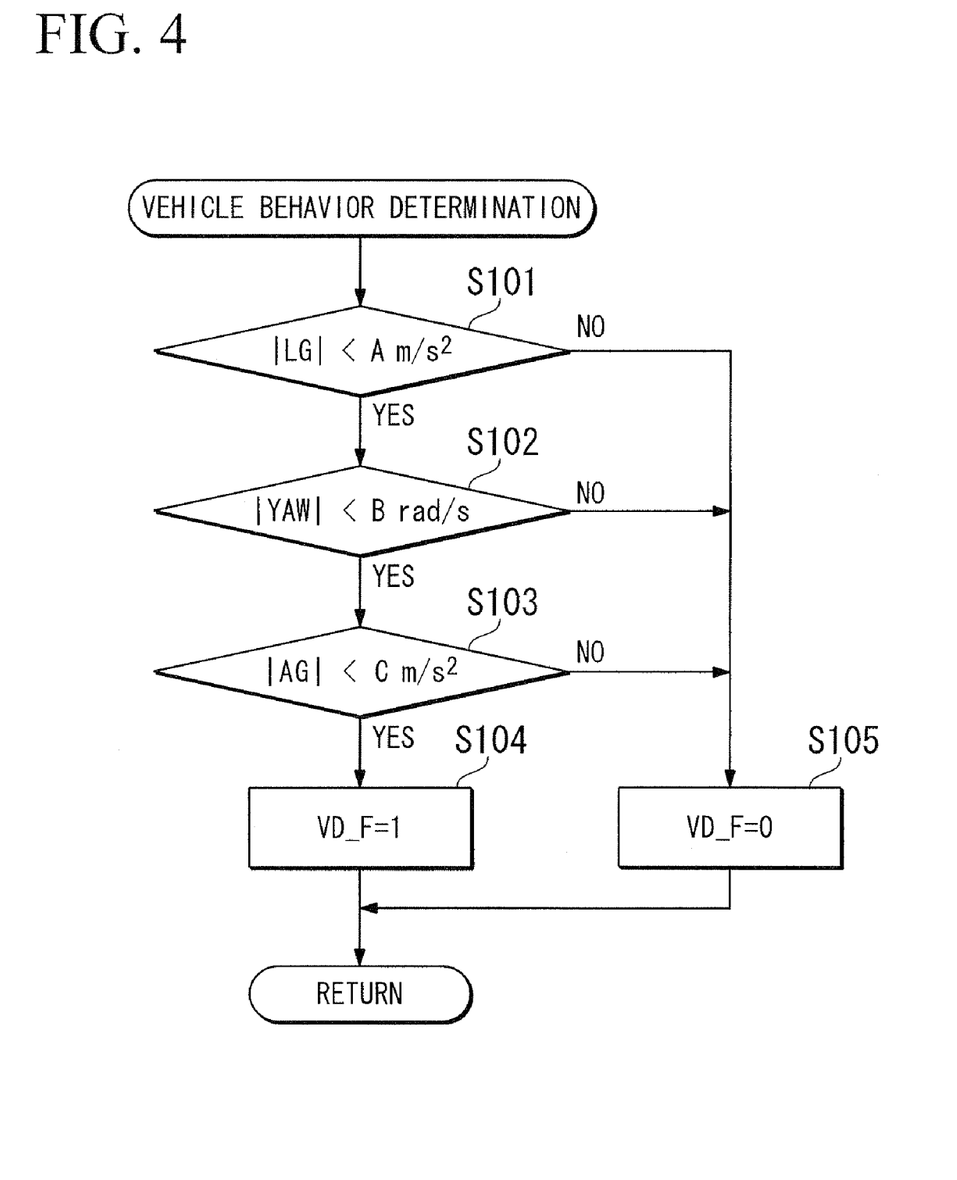
FIG. 4 is a flowchart showing a processing for determining a vehicle's behavior according to the vehicle body drifting restraining control in the first embodiment.

The flowchart in FIG. 4 shows the routine for processing the determination of vehicle behavior, which is executed at the vehicle behavior determination unit 12. The routine for processing the determination of vehicle behavior is performed repeatedly by the ECU 10.

First, in step S101, it is determined whether or not the absolute value of the lateral acceleration LG detected by the lateral G sensor 2 is less than a predetermined value A (m/s$^2$).

If the result of step S101 is "YES" (|LG|<A), the routine proceeds to step S102, and determines whether or not the absolute value of the yaw rate YAW detected by the yaw rate sensor 4 is less than a predetermined value B (rad/s).

If the result of step S102 is "YES" (|YAW|<B), the routine proceeds to step S103, and determines whether or not the absolute value of the longitudinal acceleration AG detected by the longitudinal G sensor 3 is less than a predetermine value C (m/s$^2$).

If the result of step S103 is "YES" (|AG|<C), the routine proceeds to step S104, sets the straight cruising motion flag VD_F equal to "1," and returns this value.

On the other hand, if the result of step S101 is "NO" (|LG|≧A), the result of step S102 is "NO" (|YAW|≧B), and the result of step S103 is "NO" (|AG|≧C), the routine proceeds to step S105, sets the straight cruising motion flag VD_F equal to "0," and returns this value.

The driver performance determination unit 13 determines the state of driving based on output signals from the steering angle sensor 5 and the accelerator opening sensor 6. Describing this feature in more detail, it is determined whether or not the vehicle is operated to run straight, based on the output signal by the steering angle sensor 5. It is also determined whether or not the vehicle is in cruising operation based on the output signal by the accelerator opening sensor 6.

Describing this feature in more detail, when the absolute value of the steering angle STR detected by the steering angle sensor 5 is less than a predetermined value D (rad), it is determined that the vehicle is operated to run straight. When the absolute value of the steering angle STR is greater than or equal to the predetermined value D (rad), it is determined that the vehicle is not operated to run straight.

In addition, when the accelerator opening THL detected by the accelerator opening sensor 6 is less than a predetermined value F (rad), it is determined that the vehicle is in a cruising mode of operation. When the accelerator opening THL is greater than or equal to the predetermined value F (rad), it is determined that the vehicle is not in a cruising mode of operation.

It can be said that, while a vehicle is in a cruising mode of operation, the degree of a driver's activity with respect to the vehicle's longitudinal movement is low; whereas while a vehicle is not in a cruising mode of operation, the degree of a driver's activity with respect to the vehicle's longitudinal movement is high. In other words, the driver performance determination unit 13 determines the level of a driver's activity with respect to a vehicle's longitudinal movement based on the accelerator opening detected by the accelerator opening sensor 6.

It is also possible to determine the degree of a driver's activity with respect to the vehicle's longitudinal movement based on the temporal change of the accelerator opening, namely, the accelerator opening velocity. It can be determined that, when the accelerator opening velocity is small, the degree of a driver's activity is low; whereas when the accelerator opening velocity is large, the degree of a driver's activity is high.

Furthermore, when the absolute value of the steering angle STR is less than a predetermined value D (rad) and the accelerator opening THL is less than a predetermined value F (rad), the driver performance determination unit 13 determines that the vehicle is in a straight cruising mode of operation, and sets the straight cruising operation flag DV_F equal to "1." When the absolute value of the steering angle STR is greater than or equal to the predetermined value D (rad), or, when the accelerator opening THL is greater than or equal to the predetermined value F, the driver performance determination unit 13 determines that the vehicle is not in a straight cruising mode of operation, and sets the straight cruising operation flag DV_F equal to "0." Further, the driver performance determination unit 13 outputs the straight cruising operation flag DV_F signal to the straight cruising motion determination unit 14.

Figure 5:
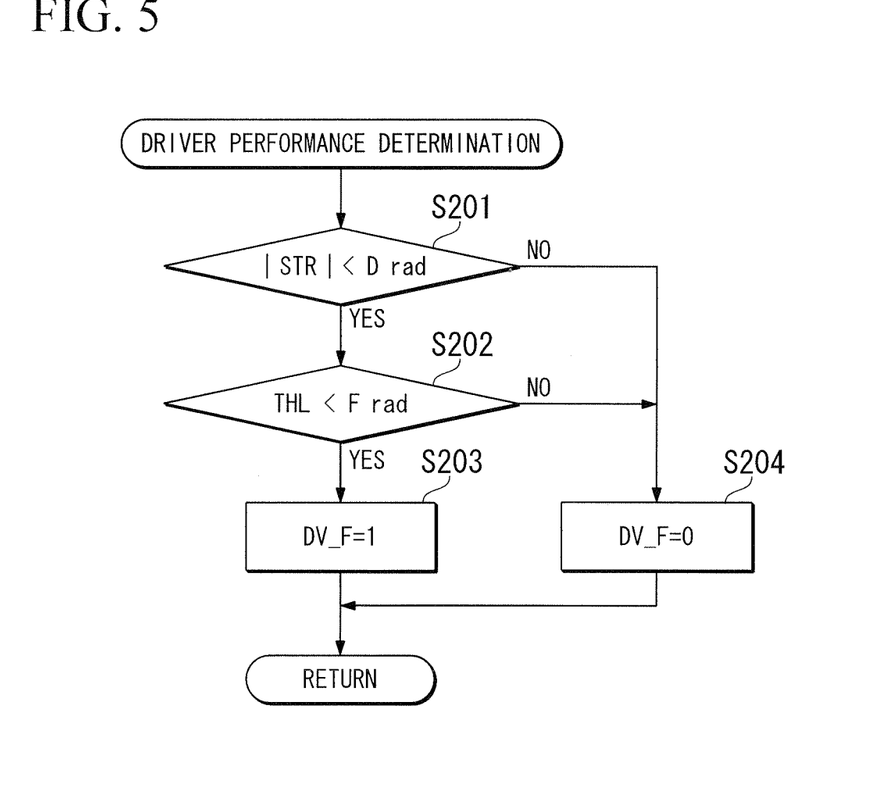
FIG. 5 is a flowchart showing a processing for determining a driver's performance according to the vehicle body drifting restraining control in the first embodiment.

The flowchart in FIG. 5 shows the routine for processing the determination of driver performance, which is executed at the driver performance determination unit 13. The routine for processing the determination of driver performance is executed repeatedly by the ECU 10.

First, in step S201, it is determined whether or not the absolute value of the steering angle STR detected by the steering angle sensor 5 is less than a predetermined value D (rad).

If the result of step S201 is "YES" (|STR|<D), the routine proceeds to step S202, and determines whether or not the accelerator opening THL detected by the accelerator opening sensor 6 is less than a predetermined value F (rad).

If the result of step S202 is "YES" (THL<F), the routine proceeds to step S203, sets the straight cruising operation flag DV_F equal to "1," and returns this value.

On the other hand, if the result of step S201 is "NO" (|STR|≧D), and the result of step S202 is "NO" (THL≧F), the routine proceeds to step S204, sets the straight cruising operation flag DV_F equal to "0," and returns this value.

The straight cruising motion determination unit 14 determines whether or not the vehicle is in a straight cruising motion and is also in a straight cruising mode of operation (hereinafter referred to as straight cruising motion/operation) based on the straight cruising motion flag VD_F signal inputted from the vehicle behavior determination unit 12 and the straight cruising operation flag DV_F signal inputted from the driver performance determination unit 13. Describing this feature in more detail, when the straight cruising motion flag VD_F and the straight cruising operation flag DV_F are both "1," the straight cruising motion determination unit 14 determines that the car is in a straight cruising motion/operation, and sets the straight cruising motion/operation flag START_END_F to "1." When at least one of the straight cruising motion flag VD_F and the straight cruising operation flag DV_F is "0," the straight cruising motion determination unit 14 determines that the car is not in a straight cruising motion/operation, and sets the straight cruising motion/operation flag START_END_F to "0." Further, the straight cruising motion determination unit 14 outputs the straight cruising motion/operation flag START_END_F signal to the control permission determination unit 20.

The switch determination unit 19 determines the state of the VSA operation OFF switch 8 based on the ON/OFF signal of the VSA operation OFF switch 8.

Figure 3:
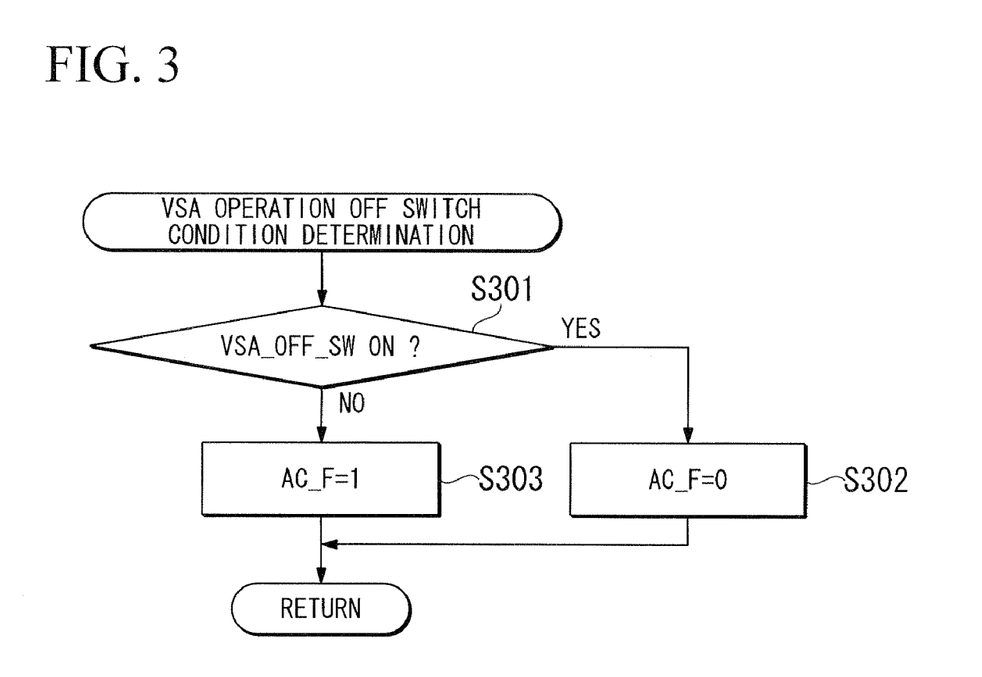
FIG. 3 is a flowchart showing a processing for determining a state of a VSA operation OFF switch according to the vehicle body drifting restraining control in the first embodiment.

The flowchart in FIG. 3 shows the routine for processing the determination of the state of the VSA operation OFF switch, which is executed by the switch determination unit 19. The routine for processing the determination of the state of the VSA operation OFF switch is performed repeatedly by the ECU 10.

First, in step S301, it is determined whether or not the VSA operation OFF switch 8 is ON.

If the result of step S301 is "YES" (ON), the routine proceeds to step S302 because the operation of the VSA is prohibited. The routine then sets the state of switch determination flag AC_F to "0," and returns this value.

On the other hand, if the result of step S301 is "NO" (OFF), the routine proceeds to step S303 because the operation of the VSA is permitted. The routine then sets the state of switch determination flag AC_F to "1," and returns this value.

Further, the switch determination unit 19 outputs the state of switch determination flag AC_F signal to the control permission determination unit 20.

The control permission determination unit 20 determines whether to switch ON (control permitted) the vehicle body drifting restraining control ON/OFF switch 16 or to switch OFF (control not permitted) the vehicle body drifting restraining control ON/OFF switch 16, based on the straight cruising motion/operation flag START_END_F signal inputted from the straight cruising motion determination unit 14 and the state of switch determination flag AC_F signal concerning the VSA operation OFF switch 8 inputted from the switch determination unit 19.

Describing this feature in more detail, when the straight cruising motion/operation flag START_END_F is "1," and the state of switch determination flag AC_F is "1," it is determined that the driver wishes the operation of the vehicle body drifting restraining control because the vehicle is in a straight cruising motion/operation, the degree of the driver's activity with respect to the vehicle's longitudinal movement is low, and the operation of the VSA is permitted by the driver's volition. Therefore, the vehicle body drifting restraining control permission flag CNT_ENB_F is set to "1," and the vehicle body drifting restraining control ON/OFF switch 16 is switched ON.

On the other hand, when the straight cruising motion/operation flag START_END_F is "0," the vehicle is not in a straight cruising motion/operation and the degree of the driver's activity with respect to the vehicle's longitudinal movement is high; and when the state of switch determination flag AC_F is "0," the operation of the VSA is prohibited by the driver's volition. Therefore, in both of these cases, it is determined that the driver does not want the operation of the vehicle body drifting restraining control, the vehicle body drifting restraining control permission flag CNT_ENB_F is set to "0," and the vehicle body drifting restraining control ON/OFF switch 16 is turned OFF.

A degree of activity determination unit determines the degree of the driver's activity with respect to the vehicle's longitudinal movement. The degree of activity determination unit includes the vehicle behavior determination unit 12, the driver performance determination unit 13, and the straight cruising motion determination unit 14.

Figure 6:
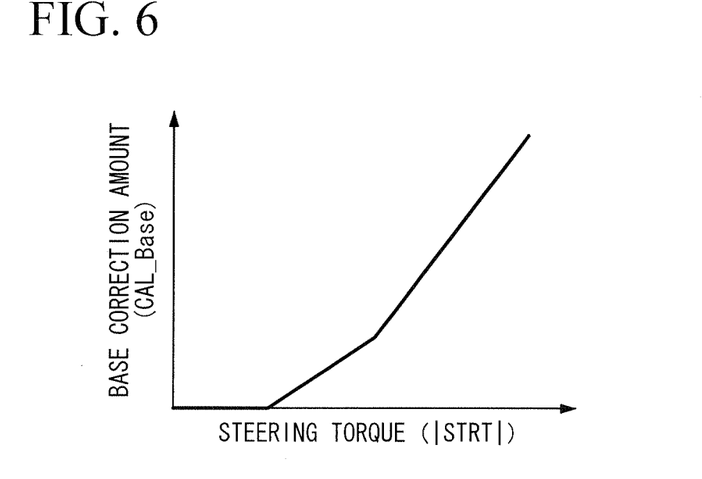
FIG. 6 is an example of a base correction amount table that is used according to the vehicle body drifting restraining control in the first embodiment.

The base correction amount calculation unit 15 calculates a base correction amount CAL_Base based on an output signal (steering torque STRT) of the steering torque sensor 7, and by referring to the base correction amount table shown in FIG. 6 for example. In the base correction amount table shown in FIG. 6, the horizontal axis represents the absolute value of the steering torque, the vertical axis represents the base correction amount CAL_Base. The base correction amount CAL_Base is "0" when the absolute value of the steering torque is less than or equal to a predetermined value. When the absolute value of the steering torque becomes greater than or equal to the predetermined value, the base correction amount CAL_Base is set up to increase gradually as the absolute value of the steering torque increases. In other words, the correction amount for the vehicle body drifting restraining control is set to increase as the steering torque detected by the steering torque sensor 7 increases.

The base correction amount CAL_Base calculated by the base correction amount calculation unit 15 is entered into a multiplier 17, multiplied by a coefficient K by the multiplier 17, and thus the correction amount CAL_Hosei is calculated (CAL_Hosei=CAL_Base×K). Here, the coefficient K is a conversion coefficient that is determined by what the main control unit 11 is controlling. When the main control unit 11 is configured as a steering assist control in an EPS, a steering torque conversion coefficient K1 is used. When the main control unit 11 is configured as a rear rudder angle control in a 4WS, a rudder angle conversion coefficient K2 is used.

When the main control unit 11 is configured as a driving torque control in a 4WD, a driving torque conversion coefficient K3 is used.

Furthermore, when the vehicle body drifting restraining control ON/OFF switch 16 is turned ON, the base control amount CNT_Base of the main control unit 11 entered into the adder 18 is added to the correction amount CAL_Hosei which is also entered into the adder 18. Thus, the control value CNT_V of the main control unit 11 is calculated and is outputted to a driver circuit that is not diagrammed (CNT_V=CNT_Base+CAL_Hosei).

In addition, when the vehicle body drifting restraining control ON/OFF switch 16 is turned OFF, the correction amount CAL_Hosei is not entered into the adder 18, and only the base control amount CNT_Base of the main control unit 11 is entered. Therefore, the base control amount CNT_Base is outputted as the control amount CNT_V of the main control unit 11 (CNT_V=CNT_Base). Thus, in this case, the correction amount CAL_Hosei becomes "0" (CAL_Hosei=0).

Figure 2:
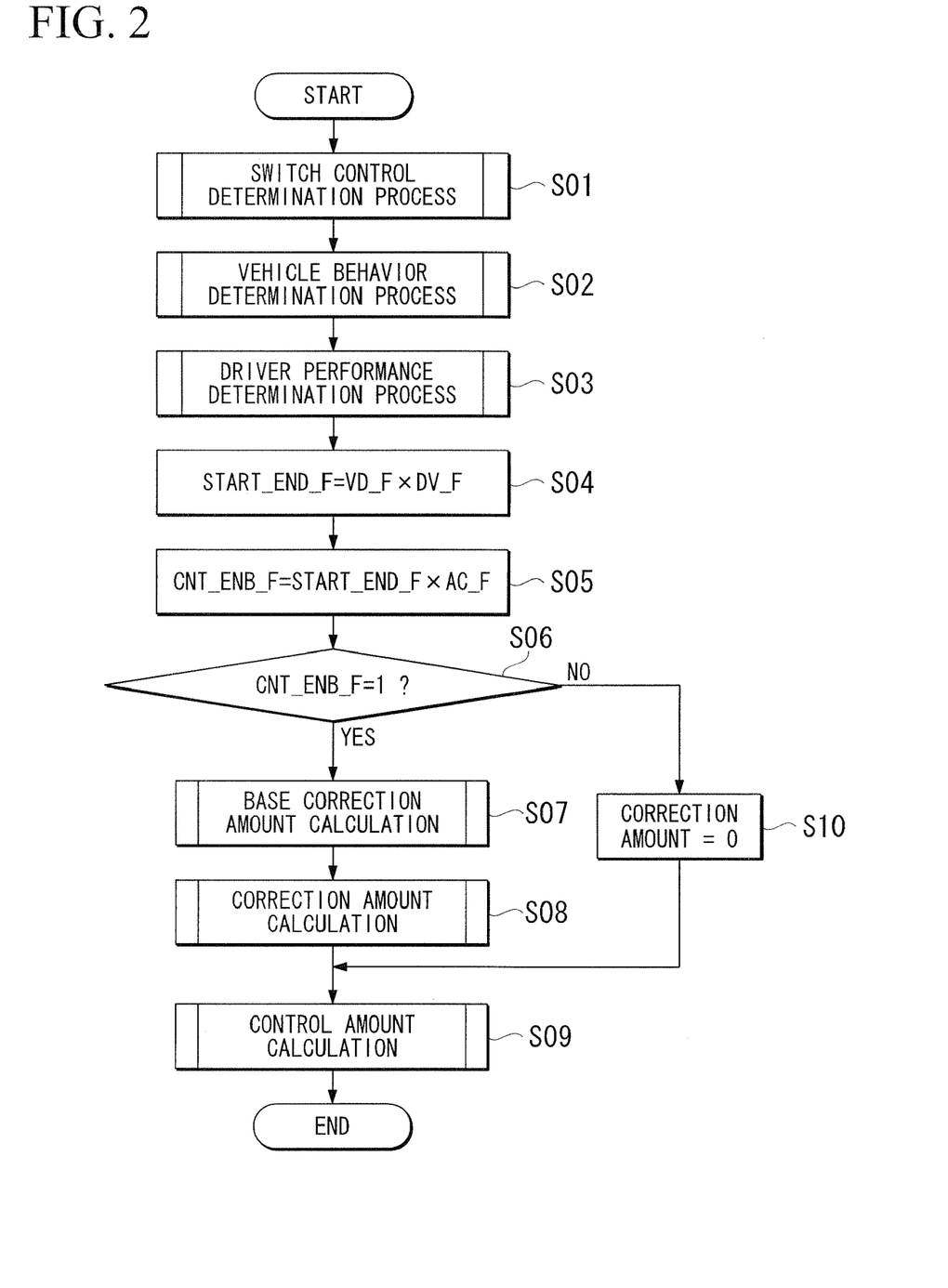
FIG. 2 is a flowchart showing a vehicle body drifting restraining control according to the vehicle body drifting restraining device in the first embodiment.

Next, a vehicle body drifting restraining control according to the present embodiment is described according to the flowchart shown in FIG. 2. The routine for vehicle body drifting restraining control, shown in the flowchart in FIG. 2, is executed repeatedly at regular time intervals by the ECU 10.

First, in step S01, based on the ON/OFF signal of the VSA operation OFF switch 8, the processing for determining the state of the switch (described earlier) is carried out, and the state of switch determination flag AC_F is set to either "1" or "0."

Next, in step S02, based on the output signals by the lateral G sensor 2, the longitudinal G sensor 3, and the yaw rate sensor 4, the processing for determining vehicle behavior (described earlier) is carried out, and the straight cruising motion flag VD_F is set to either "1" or "0."

Next, the routine proceeds to step S03, and based on the output signals by the steering angle sensor 5 and the accelerator opening sensor 6, the processing for determining driver performance (described earlier) is carried out, and the straight cruising operation flag DV_F is set to either "1" or "0."

Next, the routine proceeds to step S04, and after multiplying the straight cruising motion flag VD_F and the straight cruising operation flag DV_F, the resulting product is set as the straight cruising motion/operation flag START_END_F (START_END_F=VD_F×DV_F).

Next, the routine proceeds to step S05, and after multiplying the straight cruising motion/operation flag START_END_F and the state of switch determination flag AC_F, the resulting product is set as the VSA control permission flag CNT_ENB_F (CNT_ENB_F=START_END_F×AC_F).

Next, the routine proceeds to step S06, and determines whether or not the VSA control permission flag CNT_ENB_F is "1."

If the result of step S06 is "YES" (CNT_ENB_F=1), the routine proceeds to step S07 and calculates the base correction amount CAL_Base according to the output signal of the steering torque sensor 7.

Next, the routine proceeds to step S08, multiplies the base correction amount CAL_Base by the coefficient K, and calculates the correction amount CAL_Hosei (CAL_Hosei=CAL_Base×K).

Next, the routine proceeds to step S09, adds the base control amount CNT_Base of the main control unit 11 to the correction amount CAL_Hosei, and calculates the control amount CNT_V of the main control unit 11 (CNT_V=CNT_Base+CAL_Hosei).

On the other hand, if the result of step S06 is "NO" (CNT_ENB_F=0), the routine proceeds to step S10, sets the correction amount CAL_Hosei to "0," and proceeds to step S09. In this case, because "0" is added to the base control amount CNT_Base of the main control unit 11 as the correction amount CAL_Hosei, the control amount CNT_V of the main control unit 11 becomes equal to the base control amount CNT_Base (CNT_V=CNT_Base).

As described above, according to the vehicle body drifting restraining device 1 according to the first embodiment, when the VSA operation OFF switch is turned OFF, and, it is determined that the vehicle is in a straight cruising motion/operation and the degree of the driver's activity with respect to the vehicle's longitudinal movement is low, it is determined that the driver wants the execution of the vehicle body drifting restraining control. Therefore, it is possible to perform the vehicle body drifting restraining control. On the other hand, when the VSA operation OFF switch 8 is turned ON (in other words, when the operation of the VSA is prohibited), or when it is determined that the vehicle is not in a straight cruising motion/operation and the degree of the driver's activity is high, it is determined that the driver does not want the execution of the vehicle body drifting restraining control. Therefore, it is possible to prohibit the vehicle body drifting restraining control so that the vehicle body drifting restraining control will not be performed. Consequently, it is possible to change the degree of the driver's participation in the operation of the vehicle according to the state of the VSA operation OFF switch 8. In other words, it is possible to change the driver's level of participation in the driving of the vehicle according to the state of the brake control device operation prohibition switch. Therefore, it is possible to prevent the interference between the driver's operation of the vehicle and the restraining of vehicle body drifting, thus improving the steering feel.

Second Embodiment

Next, a second embodiment of the vehicle body drifting restraining device according to the present invention is described with reference to the drawings FIG. 7 and FIG. 8.

Figure 7:
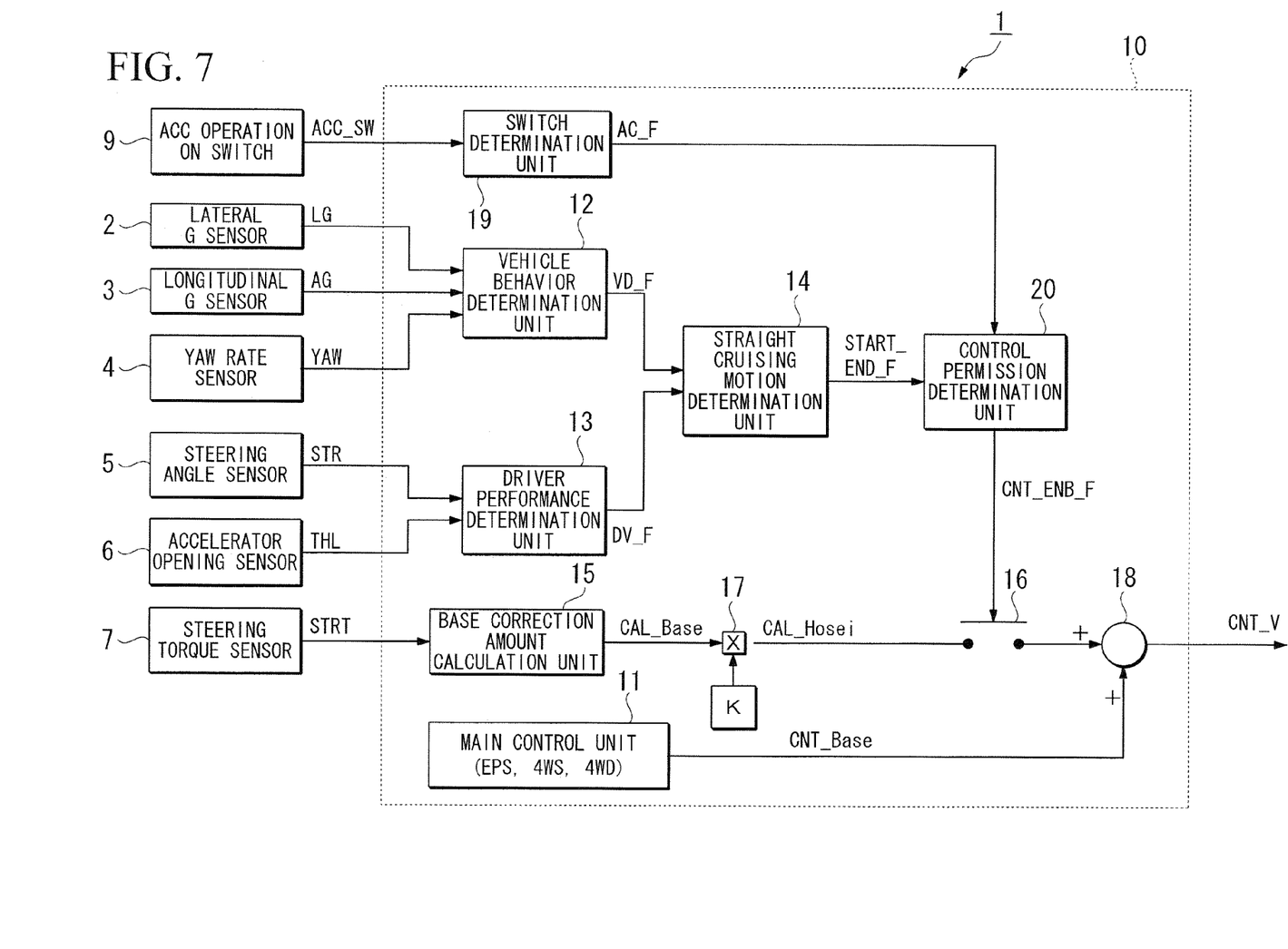
FIG. 7 is a block diagram in a second embodiment of a vehicle body drifting restraining device according to the present invention.

FIG. 7 shows a block diagram of the vehicle body drifting restraining device 1 according to the second embodiment. The vehicle body drifting restraining device 1 in the second embodiment and the vehicle body drifting restraining device 1 in the first embodiment differ only in that, the vehicle body drifting restraining device 1 in the second embodiment does not have a VSA operation OFF switch 8, but instead has an ACC operation ON switch 9 which is turned ON by the driver when the cruise control device is operated, and the switch determination unit 19 sets the state of switch determination flag AC_F signal according to whether the ACC operation ON switch 9 is turned ON or OFF.

When there is no vehicle running ahead of the present vehicle, a cruise control device controls the vehicle's movement at a constant speed set by the driver. When there is a vehicle running ahead of the present vehicle, the cruise control device controls the distance between the preceding vehicle and the current vehicle so that the current vehicle follows the preceding vehicle without exceeding the speed set by the driver. Thus, when the ACC operation ON switch 9 is turned ON, it is presumed that the driver does not actively wish to participate in the operation of the vehicle, and it is determined that the driver wants the execution of the vehicle body drifting restraining control. On the other hand, when the ACC operation ON switch 9 is turned OFF, it is presumed that the driver wishes to participate in the operation of the vehicle, and it is determined that the driver does not want the vehicle body drifting restraining control to be executed.

Figure 8:
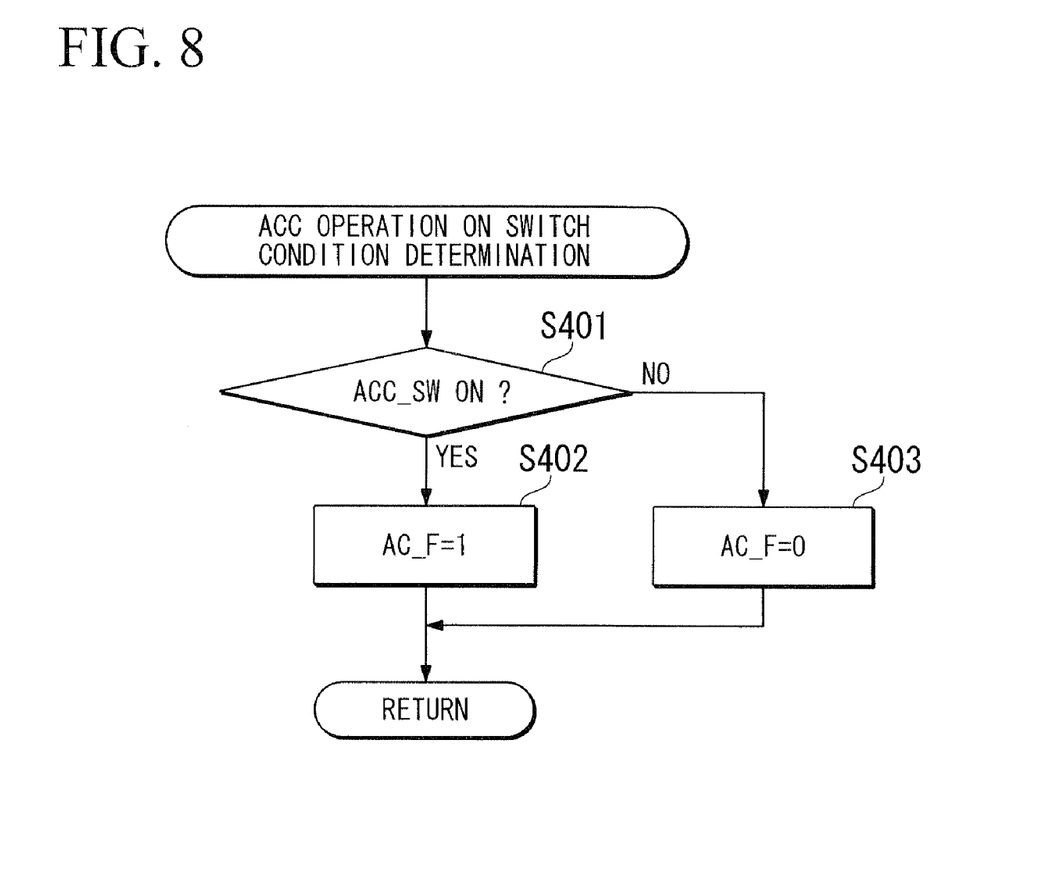
FIG. 8 is a flowchart showing a processing for determining a state of an ACC operation ON switch according to the vehicle body drifting restraining control in the second embodiment.

The flowchart in FIG. 8 shows the routine for processing the determination of the state of the ACC operation ON switch, which is executed at the switch determination unit 19. This routine for processing the determination of the state of the ACC operation ON switch is executed repeatedly by the ECU 10.

First, in step S401, it is determined whether or not the ACC operation ON switch 9 is turned ON.

If the result in step S401 is "YES" (ON), the routine proceeds to step S402 because the operation of the cruise control device is permitted, sets the state of switch determination flag AC_F to "1," and returns this value.

On the other hand, if the result of step S401 is "NO" (OFF), the routine proceeds to step S403 because the operation of the cruise control device is not permitted, sets the state of switch determination flag AC_F to "0," and returns this value.

Further, the switch determination unit 19 outputs the state of switch determination flag AC_F signal to the control permission determination unit 20.

The control permission determination unit 20 determines whether to turn ON the vehicle body drifting restraining control ON/OFF switch 16 (control permitted) or whether to turn OFF the vehicle body drifting restraining control ON/OFF switch 16 (control not permitted), based on the straight cruising motion/operation flag START_END_F signal inputted from the straight cruising motion determination unit 14 and the state of switch determination flag AC_F signal concerning the ACC operation ON switch 9 inputted from the switch determination unit 19.

Describing this feature in more detail, when the straight cruising motion/operation flag START_END_F is "1," and, the state of switch determination flag AC_F is "1," it is determined that the driver wants the vehicle body drifting restraining control to be executed, because the vehicle is in straight cruising motion/operation, the degree of the driver's activity with respect to the vehicle's longitudinal movement is low, and because the operation of the cruise control device is permitted by the driver's volition. Thus, the vehicle body drifting restraining control permission flag CNT_ENB_F is set to "1," and the vehicle body drifting restraining control ON/OFF switch 16 is turned ON.

On the other hand, when the straight cruising motion/operation flag START_END_F is "0," the vehicle is not in straight cruising motion/operation and the degree of the driver's activity with respect to the vehicle's longitudinal movement is high. When the state of switch determination flag AC_F is "0," the operation of the cruise control device is not permitted according to the driver's volition. In either of these instances, it is determined that the driver does not want the vehicle body drifting restraining control to be executed, the vehicle body drifting restraining control permission flag CNT_ENB_F is set to "0," and the vehicle body drifting restraining control ON/OFF switch 16 is turned OFF.

Since the rest of the configuration is the same as the configuration of the vehicle body drifting restraining device 1 in the first embodiment, the same reference symbols are used for the same parts in the embodiment in FIG. 7, and their description is omitted.

According to the vehicle body drifting restraining device 1 according to the second embodiment, when the ACC operation ON switch 9 is turned ON, and, when it is determined that the vehicle is in straight cruising motion/operation and the degree of the driver's activity with respect to the vehicle's longitudinal movement is low, it is determined that the driver wants the execution of the vehicle body drifting restraining control, and therefore it is possible to perform the vehicle body drifting restraining control. On the other hand, when the ACC operation ON switch 9 is turned OFF, or, when it is determined that the vehicle is not in a straight cruising motion/operation and the degree of the driver's activity is high, it is determined that the driver does not want the execution of the vehicle body drifting restraining control, and therefore it is possible to prohibit the vehicle body drifting restraining control so that the vehicle body drifting restraining control will not be performed. Consequently, it is possible to change the degree of the driver's participation in the operation of the vehicle according to the state of the ACC operation ON switch 9. Therefore, it is possible to prevent the interference between the driver's operation of the vehicle and the restraining of vehicle body drifting, thus improving the steering feel.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle body drifting restraining device which restrains a drifting of a vehicle body, wherein:
   when a brake control device operation prohibition switch, which prohibits an operation of a brake control device, is in a state of prohibition, a control for restraining the drifting of the vehicle body is prohibited.

2. A vehicle body drifting restraining device which restrains a drifting of a vehicle body, wherein:
   when a cruise control device is operating, a control that restrains the drifting of the vehicle body is performed.

3. The vehicle body drifting restraining device according to claim 1 or 2, wherein:
   the control for restraining the drifting of the vehicle body restrains the drifting of the vehicle body with respect to a lateral slope of a road surface.

4. The vehicle body drifting restraining device according to claim 1 or 2, wherein:
   the vehicle body is prevented from drifting towards a lower portion of the road surface.

5. The vehicle body drifting restraining device according to claim 1 or 2, wherein:
   the control that restrains the drifting of the vehicle body of a vehicle is performed based on a steering torque of the vehicle that is running straight.

6. The vehicle body drifting restraining device according to claim 1 or 2, wherein:
   whether or not the vehicle is running straight is determined based on a vehicle behavior determination unit and a driver performance determination unit.

7. The vehicle body drifting restraining device according to claim 1 or 2, wherein:
   a determination of a vehicle behavior determination unit is based on at least one of a lateral acceleration sensor, a longitudinal acceleration sensor, and a yaw rate sensor.

8. The vehicle body drifting restraining device according to claim 1 or 2, wherein:
   a determination of a driver performance determination unit is based on at least one of a steering angle sensor and an accelerator opening sensor.

* * * * *